United States Patent Office 3,306,800
Patented Feb. 28, 1967

3,306,800
BONDING THERMOPLASTIC RESINS TO
INORGANIC MATERIALS
Edwin P. Plueddemann, Midland, Mich., assignor to Dow
Corning Corporation, Midland, Mich., a corporation
of Michigan
No Drawing. Filed Apr. 27, 1964, Ser. No. 362,923
18 Claims. (Cl. 156—329)

This aplication is a continuation-in-part of U.S. patent application Serial No. 111,147, filed on May 19, 1961 now U.S. Patent 3,223,577; which in turn is a continuation-in-part of U.S. application Serial No. 86,601, filed February 2, 1961, now abandoned.

This application relates to a new method of bonding thermoplastic resins to inorganic materials such as glass, ceramic, silicone elastomers, aluminum, steel, and various metal oxides.

Organic plastics can be divided into two categories: thermoplastic resins, and thermosetting resins. The former are materials which soften on heating and harden on cooling without any appreciable change in properties due to the heating. Thermosetting resins are materials which harden on heating due to the crosslinking of heat-reactive, cross-linkable radicals which are present in appreciable numbers in the thermosetting resin molecules.

Thermosetting resins are easily bonded to inorganic surfaces, for the various heat-reactive radicals in thermosetting resins can crosslink with radicals found on the inorganic surfaces, or with radicals found in an organofunctional silane primer which has been placed on a surface.

Thermoplastic resins, however, have few, if any heat-reactable crosslinking radicals, at least in the sense of radicals that cause crosslinking at a temperature below 200° C. Therefore, attempts to bond these thermoplastic resins are often disappointing, since the bond which is formed to the substrate is primarily nonchemical. Furthermore, water from the surroundings is often preferentially adsorbed on the inorganic surface to which a thermoplastic is bonded, causing the bond with the thermoplastic to spontaneously deteriorate.

The main object of this invention is to provide a way of making superior water-stable bonds between thermoplastic resins and inorganic materials. Such a process is especially advantageous in that it can make thermoplastic resins competitive with the more expensive thermosetting resins by increasing the stability and strength of the bond of such thermoplastics with inorganic materials.

This invention also has the advantage of often being operative at room temperature.

This invention comprises the method of bonding (1) a thermoplastic resin to (2) a material selected from the group consisting of solid siliceous[1] materials, metals, and metal oxides comprising (a) applying to the surface of at least one of the substrates a polymeric, organic material compatible with the thermoplastic resin, having attached thereto through stable bonds an average of at least one silyl group, wherein at least one silicon atom it attached to radicals selected from the group consisting of oxygen, hydrolyzable groups, hydroxyl groups, and hydrocarbon and halohydrocarbon radicals of less than 10 carbon atoms, there being an average of a total of at least three silicon-bonded hydrolyzable and/or hydroxyl groups per polymeric, organic molecule, said polymeric, organic material having a molecular weight of at least 2000; and (b) bringing (1) and (2) in contact with each other under conditions where at least one of ---
[1] The term siliceous materials includes both organosilicon compounds such as silicone rubber and resins, and inorganic materials such as silica, asbestos, glass, etc.

them is in a plastic condition, and (c) thereafter allowing the plastic material to solidify, wherein an improved bond is obtained.

Ingredient (1) can be any thermoplastic resin, i.e. any organic polymer or copolymer which contains no substantial amounts of radicals that will tend to crosslink at temperatures below 200° C. The ingredient (1) resins will, in general, melt and refreeze without undergoing any substantial change in properties through the heating process.

Examples of operative thermoplastic resins are those derived from difunctional monomers and include polyolefins such as polyethylene, polypropylene, polystyrene, polybutylene and polyisobutylene; halogenated polyolefins such as polyvinylchloride, polyvinylidenechloride, polyvinylidenefluoride, polytetrafluoroethylene and polytrifluoropropene; substituted polyolefins such as polyvinylacetate, polyacrylonitrile, polyacrylate and polymethacrylates such as polymethylmethacrylate and polyethylmethacrylate; polyesters such as polyethyleneglycolterephthalates and poly-1,4-butanediolisophthalates; polyamides such as those formed from adipic acid and hexamethylenediamine; polycarbonates such as the reaction products of carbonylchloride and p,p'-bishydroxyphenyldimethylmethane; cellulosic ethers and esters such as cellulose acetate and ethyl cellulose; and polyacetals such as polyformaldehyde.

It should be understood that copolymers of any of the above can be used.

Ingredient (2) can be any solid, siliceous material such as glass, quartz, ceramic, asbestos, silicone resins, laminates containing a silicone resin and/or siliceous fibres, or silicone elastomers. It can also be any metal or metal oxide such as aluminum, steel, copper, nickel, magnesium, MgO, $Fe_2O_3$, or $Al_2O_3$.

The polymeric, organic bonding agent of this application can be any organic polymeric material, so long as the final product is compatible with the thermoplastic resin (1) which is to be bonded. Thus, the bonding agent of this invention can be prepared by silylating any of the thermoplastic resins shown under (1) above.

The polymeric, organic bonding agent must have a molecular weight of at least 2000. It is preferred, however, to use a polymeric, organic bonding agent with a molecular weight of at least 10,000.

As stated above, the polymeric, organic bonding agent has attached silyl groups. Each silyl group can contain one or more silicon atoms. The nature of the linking group between the silyl group and the organic polymer is immaterial so long as it is stable, i.e. as long as it is free of hydrolyzable linkages such as silicon-oxygen, silicon-nitrogen, etc., which render any group containing them unstable. In other words, the silicon of the silyl groups must be linked to the polymer through Si—C linkages, although the linking group can contain other atoms such as O, S. N, etc., so long as they are not attached directly to a silicon atom. Examples of groups containing stable linking groups which are suitable for this invention are shown below.

If there is more than one silicon atom in each silyl group, the silicon atoms can be connected to each other by means of oxygen linkages (the siloxane linkage), hydrocarbon linkages (e.g. ≡SiCH$_2$CH$_2$Si≡ or

or halohydrocarbon linkages (e.g. ≡SiCH$_2$CHClCH$_2$Si≡) of less than 10 carbon atoms each. The silyl group can also contain silicon-bonded monovalent hydrocarbon and halohydrocarbon radicals of less than 10 carbon atoms each; e.g. alkyl radicals such as methyl, ethyl, isopropyl, and 2-ethylhexyl; olefinic radicals such as vinyl, allyl, and 3-hexenyl; cycloaliphatic radicals such as cyclopentyl and cyclohexenyl; aromatic radicals such as phenyl, naphthyl, tolyl, and benzyl; haloalkyl radicals such as 2-bromoethyl, 3,3,3-trifluoropropyl, and 2-perfluorohexylethyl; haloolefins such as 3,3,3-trifluoroallyl and 4-chlorohexenyl; cyclohaloaliphatic radicals such as bromocyclopentyl and chlorocyclohexenyl; and haloaromatic radicals such as chlorophenyl, dibromonaphthyl, and trifluorotolyl radicals.

The silyl groups, must contain sufficient silicon-bonded hydrolyzable and/or hydroxyl groups so that there is an average of at least 3 hydrolyzable or hydroxyl groups per polymeric, organic molecule of the bonding agent. It is preferred for the polymeric bonding agent to have an average per molecule of 10 or more silicon-bonded hydrolyzable and/or hydroxyl groups, and 3 or more silyl groups.

The hydrolyzable groups of this invention can be any silicon-bonded radical which is replaced by water to form a silanol (Si—OH) group. Such groups are well-known to the art, a representative sample of them being alkoxy groups such as methoxy, ethoxy, allyloxy, β-methoxyethoxy, and isopropoxy; acyloxy groups such as acetate, propionate, and butyrate; halogen groups such as chloride, bromide, and iodide; ketoxime groups such as

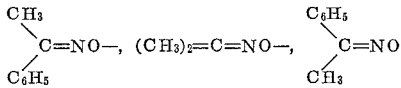

and the isocyanate group.

The composition of the divalent radical which links the silyl groups to the rest of the polymeric, organic bonding agent is variablbe, and depends on the method of making the bonding agent.

The bonding agent can be made, for example, by copolymerizing the organic monomers used to make up the material with an appropriate silane or siloxane.

If styrene is chosen as the basic monomer unit, it is an easy matter to copolymerize $CH_2=CHSi(OCH_3)_3$ with the styrene to form a silylated polystyrene. Also a siloxane containing X groups and olefinic groups can be copolymerized with styrene to form a silylated polystyrene in accordance with this invention. An example of such a siloxane is

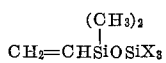

The above silyl units can also be copolymerized with ethylene, propylene, butadiene, and other organic, unsaturated monomers. Other silyl units which contain unsaturated side chains, such as

or partial hydrolyzates thereof, can also be copolymerized with organic, unsaturated monomers, where X is a hydrolyzable group.

The conditions of the copolymerization reactions approximate the reaction conditions for the homopolymerization of the organic monomer alone, and are familiar to one skilled in both organic and silicone chemistry. Free radical generating catalysts such as the common peroxide catalysts or radiation are generally used.

The polymeric, organic bonding agents of this invention can also be made by grafting the silyl groups of this invention into organic polymers. For example, the compound

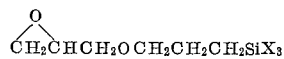

will react with the active hydrogen of hydroxyl groups, carboxylic acid groups, or amino groups which may be found in organic polymers. The silyl group is attached to the polymer by means of a silicon-carbon bond, e.g.:

(1) 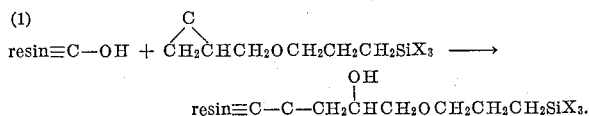

(2) 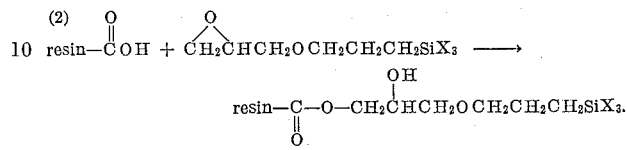

Similarly, the compounds $$NH_2CH_2CH_2NHCH_2CH_2CH_2SiX_3$$

or $H_2NCH_2CH_2CH_2SiX_3$ will react with halogenated resins to form a quaternary ammonium salt linkage which expels a hydrohalic acid on heating, as will other silyl primary and secondary amines. In addition to these, Example 4 shows a method for grafting unsaturated silyl groups into polyolefins.

Silyl groups can be grafted, therefore, to such organic polymers as epoxy resins, polyolefins, alkyd resins (copolymerized with a slight excess of either COOH or OH groups), polyurethanes, and polyvinyl chloride.

Representative samples of the silyl groups of this invention which can be copolymerized or grafted into organic polymers are therefor:

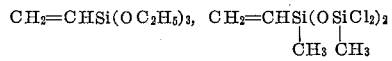

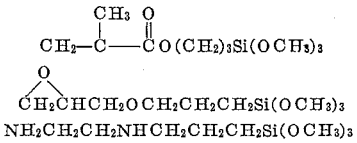

$CH_2CHCH_2OCH_2CH_2CH_2Si(OCH_3)_3$
$NH_2CH_2CH_2NHCH_2CH_2CH_2Si(OCH_3)_3$

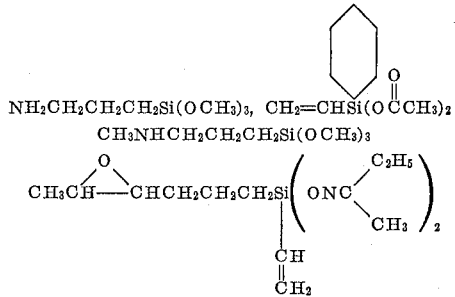

$NH_2CH_2CH_2CH_2Si(OCH_3)_3$, $CH_2=CHSi(OCCH_3)_2$
$CH_3NHCH_2CH_2CH_2Si(OCH_3)_3$

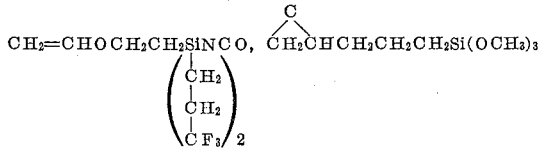

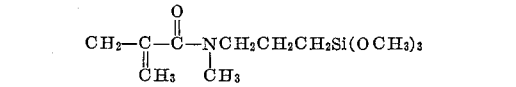

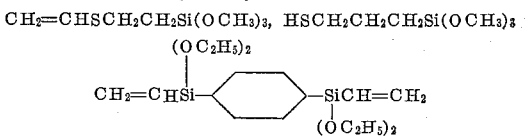

$CH_2=CHSCH_2CH_2Si(OCH_3)_3$, $HSCH_2CH_2CH_2Si(OCH_3)_3$

Partial hydrolyzates of the above materials and others like them, are also useable, and are within the scope and claims of this invention.

The amount of the polymeric, organic bonding agent applied to the surface of ingredients (1) or (2) is not critical. An extremely thin layer of the material can be an effective bonding agent. The best bonding is obtained when the entire surface to be bonded is covered with a thin layer of the polymeric, organic bonding agent. This is preferably done by applying the bonding agent as a solution in a volatile solvent which is chemically inert toward the substrates and the polymeric, organic bonding agent.

As stated above, either or both of substrates (1) and (2) must be in a plastic condition during the time of bonding. "Plastic condition" simply means a flowable condition, and it is only required that a thin layer of the substrate be in such a plastic condition. This can be achieved in several ways:

One way is to wet (1) and/or (2) with a solvent for the thermoplastic substrate (1). This solvent can also be a carrier for the polymeric, organic bonding agent, as a solution or an emulsion. The solvent dissolves a thin layer of the thermoplastic substrate, thereby putting it in a plastic condition. Then, while the substrate (1) is still in this plastic condition, it is placed in contact with substrate (2). An excellent bond can be obtained by using pressure, but mere contact until the solvent dries will give an improved bond. Alternatively, the bonding agent can be put on substrate (2) or dissolved in substrate (1), and substrate (2) can then be contacted with a molten substrate (1), which is then allowed to harden. Porcelain teeth can be placed in thermoplastic (e.g. polymethylmethacrylate) dentures in this manner.

The phrase "applying to the surface" includes the process of mixing or dissolving the bonding agent into one of the substrates, as such a process will necessarily cause some bonding agent to be found at the surface of the substrate. Examples 5 and 7 show that the process of dissolving the bonding agent in one of the substrates can be an effective method of bonding.

Another way to put substrate (1) into a plastic condition is simply to heat it to the softening point. Substrates (1) and (2) are then pressed together, with the bonding agent between them to give an improved bond.

Substrates (2) can be in a plastic condition if it is an uncured siloxane resin or elastomer. It is generally preferred, with respect to the siloxane elastomers, for the uncured elastomer to be of the room temperature vulcanizing type, so that no high temperature cure is required. It is then feasible to bond and cure a film of siloxane elastomer onto a preshaped thermoplastic resin structure. This technique is especially useful in making siloxane elastomer liners for thermoplastic denture plates.

A preferred method of doing this is to place a solution of a silylated polymethylmethacrylate bonding agent onto a preformed polymethylmethacrylate denture. The room temperature vulvanizing siloxane elastomer is then placed on the denture in a plastic, unvulcanized form, and allowed to cure. An excellent bond between denture and elastomer can be formed.

Substrates (1) and (2) can be bonded together in a variety of forms. A single piece of each substrate can be bonded together to form a continuous two-dimensional bond. A laminate of alternating sheets of substrates (1) and (2) can also be made, as can aggregates of chunks, granules, or fibres of substrates (1) and (2), by the method of this invention. Additionally, one of the substrates can be used as a filler for the other substrate, which is mixed in plastic form with the filler substrate. The bonding agent of this invention serves to add strength to the composition by bonding the filler to the surrounding substrate.

The following examples are illustrative only, and should not be construed as limiting the invention, which is properly delineated in the appended claims.

EXAMPLE 1

The following compositions were applied to several glass fabric sheets in the form of a 0.2 weight percent of solids solution in toluene, and allowed to dry.

| Run Number | Composition |
|---|---|
| 1 | None. |
| 2 | A copolymer with a molecular weight of 5,000 consisting of 90 mol percent styrene units and 10 mol percent $CH_2=C-\overset{O}{\overset{\|}{C}}OCH_2CH_2CH_2Si(OCH_3)_3$ units. $\overset{\|}{CH_3}$ |
| 3 | A similiar copolymer, having a molecular weight of 10,000. |
| 4 | A similiar copolymer, having a molecular weight of 20,000. |
| 5 | Pure $CH_2=\overset{CH_3}{\overset{\|}{C}}-\overset{O}{\overset{\|}{C}}OCH_2CH_2CH_2Si(OCH_3)_3$. 0.2 weight percent in water rather than toluene. |

Five laminates were made from these treated glass fabric sheets and polystyrene by pressing the laminate to a thickness of 0.15 in. at a temperature of 250° C. for 20 minutes. Each laminate contained treated glass fabric from only a single run; laminate number 1 used the fabric from run number 1; laminate number 2 used the fabric from run number 2, etc.

The mechanical strengths of the laminates at the break point were tested:

| Laminate No. | Flex Strength (p.s.i.) | | Compressive strength (p.s.i.) | |
|---|---|---|---|---|
| | Dry Laminate | Wet Laminate [1] | Dry laminate | Wet laminate [1] |
| 1 | 32,800 | 20,800 | 9,100 | 5,000 |
| 2 | 41,400 | 39,100 | 15,800 | 17,300 |
| 3 | 43,900 | 44,500 | 21,200 | 21,400 |
| 4 | 44,700 | 45,300 | 25,000 | 28,300 |
| 5 | 33,300 | 25,300 | 16,500 | 13,000 |

[1] After 2 hrs. of boiling in water.

EXAMPLE 2

Seven glass microscope slides were treated in the following manner:

Slide No.
1 No treatment.
2 Treated with a 0.1 weight percent of solids solution of benzene and the copolymer of Example 1, run number 2.
3 Treated as slide No. 2, only with the copolymer of Example 1, run No. 3.
4 Treated as slide No. 2, only with the copolymer of Example 1, run No. 4.
5 Treated as slide No. 2, only with a 10,000 molecular weight copolymer consisting of 94 mol percent styrene units and 6 mol percent

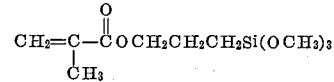

units.

6 Treated as slide No. 2 with a 10,000 molecular weight copolymer consisting of 88 mol percent styrene units and 12 mol percent

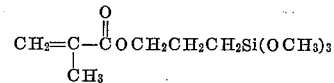

units.

7 Treated as slide No. 2, only with a 10,000 mol wt. copolymer consisting of 75 mol percent styrene units and 25 mol percent

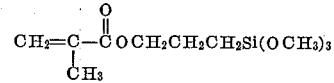

units.

Polystyrene was bonded to the treated face of each slide by heating until the styrene became plastic, and then cooling.

The bonded slides were then placed in room temperature water for two hours, and then boiled for an additional one hour. The effect of the water on the styrene-glass bond is as follows: "off" means that the styrene had floated away from the glass; "poor" means that the styrene could be pushed off the glass slide with the thumb; "fair" means that the styrene could be peeled from the glass slide with a razor blade; and "good" means that the styrene could not be peeled, only chipped, from the slide with a razor blade.

Slide No.:
1 ------------------------------------ Off
2 ------------------------------------ Poor
3 ------------------------------------ Fair
4 ------------------------------------ Good
5 ------------------------------------ Poor
6 ------------------------------------ Fair
7 ------------------------------------ Good

EXAMPLE 3

To 5 different 52 g. samples of styrene was added 26.5 g. of acrylonitrile, 12.5 g. of

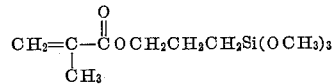

and X g. (i.e. variable) of $HSCH_2CH_2CH_2Si(OCH_3)_3$. Each sample was dissolved in 90 g. of benzene. 0.2 g. of azo-bisisobutyronitrile was added to each sample, and they were refluxed for six hours.

In each sample of copolymerization which was at least 50 percent complete took place. The product was essentially a terpolymer of styrene, acryonitrile and

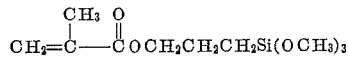

with $-SCH_2CH_2CH_2Si(OCH_3)_3$ endblocks.

Portions of each of the polymers obtained from the above samples were made into 0.2 percent by weight toluene solutions, and fresh, heat-cleaned glass cloth was dipped into each of them.

The glass cloths that had been dipped in each sample polymer solution were dried and then made into a laminate by pressing them with alternating 4 to 5 mil sheets of a 50 mol percent styrene and 50 mol percent acrylonitrile copolymer at 65 p.s.i. and 250° C.

The amounts of $HSCH_2CH_2CH_2Si(OCH_3)_3$ added, the resulting molecular weights of the silylated copolymers, and the physical properties of each laminate that was made is shown below for each copolymer sample:

EXAMPLE 4

50 g. of polyethylene, 20 g. of vinyltrimethoxysilane, 0.5 g. of benzoyl peroxide, and 100 g. of toluene were refluxed for 15 hours.

Methanol was then added, which caused a precipitate to form. This precipitate was filtered, redissolved in toluene, reprecipitated in methanol, and dried. It consisted of a graft copolymer of polyethylene, containing approximately 6 weight percent

units.

Two similar graft copolymers were prepared, one having a molecular weight of 1500 and one having a molecular weight of 30,000, the molecular weight of the copolymeric product being substantially the same as the molecular weight of the polyethylene reactant.

Several glass slides were treated with a one weight percent toluene solutions of one or the other of the copolymers, and allowed to dry.

Slides that had been treated with the same copolymer were then bonded end to end by means of molten polyethylene with a molecular weight of about 50,000 to form end-glued composites of two slides each. These composites were immersed at a 45° angle to the vertical in boiling water, so that the weight of the slides was supported by the polyethylene bonds.

The average time required for the weight of the composites to break the bonds holding them together is recorded below as a function of the primer used on the slides:

| Primer used: | Average time before buckling, minutes |
|---|---|
| None | 3 |
| 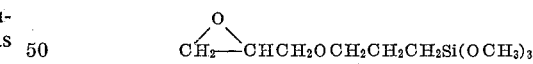 | 11 |
| The above graft copolymer with a mol wt. of 1500 | 8 |
| The above graft copolymer with a mol wt. of 30,000 | 55 |

EXAMPLE 5

A graft copolymer of ethyl cellulose was made in the following manner: 2 g. of commercial ethylcellulose (with a molecular weight of over 2000) was mixed with 5 g. of

and this mixture was heated to 180° C.

Several sheets of glass were coated with a film of ethyl cellulose by applying a 10 weight percent solution of ethyl cellulose in acetone to the glass and allowing the acetone to evaporate.

Some of the sheets of glass had been pretreated with primers, i.e. pure $$CH_2\overset{O}{\overset{}{\diagdown}}CHCH_2OCH_2CH_2CH_2Si(OCH_3)_3$$

| Sample No. | Grams of $HSCH_2CH_2CH_2Si(OCH_3)_3$ | Mol weight of the silylated copolymer | Laminate Flex Strength at breakpoint (p.s.i.) | | Laminate Compressive Strength at breakpoint (p.s.i.) | |
|---|---|---|---|---|---|---|
| | | | Dry | Wet, 2 hrs. boiling water | Dry | Wet, 2 hrs. boiling water |
| 1 | 0.5 | 36,000 | 45,500 | 45,700 | 25,600 | 22,500 |
| 2 | 1.0 | 18,000 | 50,100 | 42,800 | 18,600 | 17,400 |
| 3 | 1.5 | 12,000 | 52,100 | 46,500 | 30,100 | 23,400 |
| 4 | 2.0 | 9,000 | 49,000 | 46,500 | 19,100 | 18,700 |
| 5 | 4.0 | 4,500 | 49,900 | 49,000 | 24,500 | 21,600 |
| 6 | Untreated glass cloth used | | 30,800 | 9,000 | 10,000 | 4,000 | or the above graft copolymer. These primers were placed on the glass by means of applying a solution of the material to the glass and allowing the solvent to evaporate.

The ethyl cellulose film on unprimed glass could be easily peeled off after two hours in lukewarm water.

The same was true of the bonded glass which had been primed with

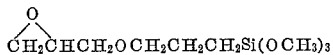

The glass which had been primed with the graft copolymer, however, still held the ethyl cellulose with a firm bond after a two hour soak in lukewarm water. After an additional one hour boil, the ethyl cellulose could still only be removed by peeling with a razor blade.

Other sheets of glass were coated with ethyl cellulose by the application of a 10 weight percent ethyl cellulose solution in acetone which also contained one weight percent of either

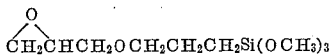

or the graft copolymer.

The bonds obtained were similar in characteristics to those obtained when the two primers were placed on the glass before the application of the ethyl cellulose solution.

EXAMPLE 6

To 100 g. of amorphous polypropylene with a molecular weight of about 30,000 was added 200 g. of toluene, 25 g. of

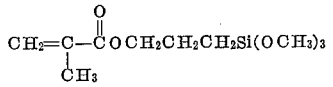

and 1 g. of benzoyl peroxide.

This was refluxed for four hours, the product being precipitated and washed in methanol. The dried precipitate was found to contain two weight percent silicon, and was a graft copolymer of propylene and

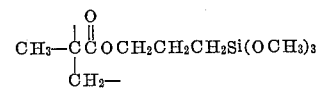

units.

A toluene solution of this copolymer was placed on a glass slide and allowed to dry. Molten polyethylene was then placed on the slide and allowed to cool.

A superior, water resistant bond was obtained between the polyethylene and the glass. The same technique was used to bond polypropylene to glass with satisfactory results.

EXAMPLE 7

A terpolymer with a molecular weight of about 10,000 was made by the method of Example 3, containing 47 mol percent styrene units, 47 mol percent acrylonitrile units, 5 mol percent

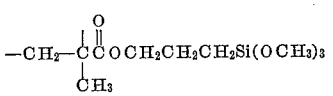

units, and 1 mol percent —SCH$_2$CH$_2$CH$_2$Si(OCH$_3$)$_3$ endblocks.

100 g. of a copolymer of 50 mol percent styrene and 50 mol percent acrylonitrile was mixed with 300 g. of ethyl acetate, 50 g. of ¼-inch chopped glass roving and 0.1 g. of the above terpolymer.

After the solvent was allowed to evaporate, the composition was compression molded to a ¼-inch sheet.

The sheet was compared to another sheet made in an identical manner, but without the terpolymer:

| | Flex strength (p.s.i.) | | Notched Izod impact test (ft.-lbs.) |
|---|---|---|---|
| | Dry | After 2 hrs. in boiling water | |
| Without terpolymer | 19,300 | 18,700 | 2.60 |
| With terpolymer | 20,400 | 23,000 | 3.36 |

EXAMPLE 8

To 40 g. of methylmethacrylate was added 50 g. of benzene, 10 g. of

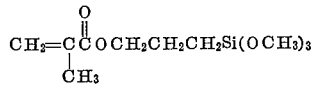

0.8 g. of HSCH$_2$CH$_2$CH$_2$Si(OCH$_3$)$_3$, and 0.08 g. of benzoyl peroxide. This was refluxed for 5 hours to obtain a copolymer consisting of methylmethacrylate units,

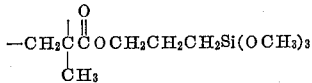

units, and —SCH$_2$CH$_2$CH$_2$Si(OCH$_3$)$_3$ endblocks.

This copolymer was diluted to a one weight percent solids solution in benzene, and 10 drops were applied to a porcelain plate and dried.

A composition known as Densene (Cosmos Dental Products) consisting essentially of polymethylmethacrylate powder, methylmethacrylate fluid, and a polymerization catalyst was bonded to the porcelain plate by drying it for 3 hours and then curing it at 95° C. for 16 hours.

Another porcelain plate which had not been treated with the silylated copolymer was bonded to Densene in a similar manner.

The polyacrylate film on the untreated porcelain plate could be peeled off with a razor blade.

The polyacrylate film on the treated porcelain plate was not removable by a razor blade except by chipping away the polyacrylate, even after six hours of boiling in water.

This indicates that the above primer is suitable for imbedding porcelain teeth in polymethylmethacrylate dental plates.

EXAMPLE 9

A copolymer with —SCH$_2$CH$_2$CH$_2$Si(OCH$_3$)$_3$ endblocks was made by refluxing for 5 hours: 100 g. of methylmethacrylate, 125 cc. of benzene, 25 g. of

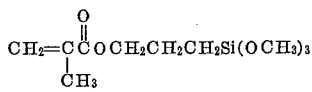

2 g. of HSCH$_2$CH$_2$CH$_2$Si(OCH$_3$)$_3$, and 0.2 g. of azobisisobutyronitrile.

A portion of this copolymer was diluted to one weight percent solids in benzene, and this was applied and allowed to dry to part of a plate made of a copolymer of 50 mol percent styrene and 50 mol percent acrylonitrile.

A room temperature vulcanizing dimethylsiloxane elastomer stock with silica filler was poured onto the treated plate and allowed to vulcanize.

The elastomer was bonded in part to a portion of the plate which had been treated, and in part to a portion of the plate which had not been treated.

The bond between the elastomer and the untreated portion of the plate was easily severed by means of a razor blade. The bond between the elastomer and the treated portion of the plate was not severable by a razor blade, even after 6 hours of boiling in water.

EXAMPLE 10

An emulsion copolymer consisting of 30 weight percent solids in water was made by known methods from 76 parts by weight of ethylacrylate, 19 parts of vinylacetate, and 5 parts of vinyltriethoxysilane.

A glass sheet was treated with the emulsion and allowed to dry.

Polyvinyl acetate beads were melted onto the glass sheet and allowed to harden. The same process was repeated on an untreated glass sheet.

Both bonded glass sheets were boiled in water for one hour. The bond between the untreated glass sheet and the polyvinyl acetate was very weak; and the two materials could be pulled apart with the fingers. The bond between the treated glass sheet was still strong: a razor blade could not cleanly separate the two components.

EXAMPLE 11

To 100 parts by weight of a 25 weight percent solution of polyvinylpyrrolidone in nu-butanol was added one-half part of benzoyl peroxide and 2.5 parts by weight of

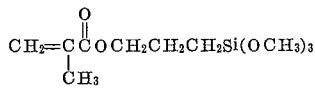

This was refluxed for about 4 hours to give a graft copolymer of the above silane and polyvinylpyrrolidone.

A glass slide was dipped in a one percent solution of the above copolymer in n-butanol. The slide was dried for 5 minutes at 100° C.

The slide was then coated with a 20 percent vinylchloride-vinyl acetate copolymer solution in acetone, this being air dried for 30 minutes and then dried for 15 minutes at 100° C.

An untreated slide was also treated in the above manner.

The bond between the untreated glass and the thermoplastic copolymer was very poor; the thermoplastic could be peeled off the glass. The bond between the treated glass and the thermoplastic copolymer was very good; a razor blade could not cleanly remove the thermoplastic from the glass.

EXAMPLE 12

25 g. of a copolymer of 80 mol percent styrene and 20 mol percent maleic anhydride, having a molecular weight of about 50,000, and 6 g. of

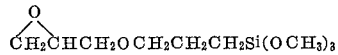

were dissolved in an equal weight of benzene.

Two portions of this primer solution were diluted with benzene to 1 and 5 percent solids (by weight) respectively. Glass slides were treated with these solutions and dried.

The slides were then filmed over with a 50 percent styrene and 50 percent acrylonitrile copolymer through application to the slide of a 25 percent solution of the copolymer in ethyl acetate, and subsequently drying the slide.

One untreated slide was filmed over with the above 25 percent copolymer solution to which had been added a small amount of the 5 percent primer solution, described above.

The condition of the polymer-glass bonds are described below:

| Primer Used | Dry | Wet | After 1 hr. boil |
|---|---|---|---|
| None | Good | Off | |
| 1% primer solution | Fair | Fair | Fair. |
| 5% primer solution | Good | Good | Do. |
| 5% primer solution added to coating polymer; untreated glass. | do | Fair | Do. |

Example 2 can be consulted if further explanation of this chart is required.

EXAMPLE 13

A copolymer consisting of 100 molar parts of methylmethacrylate, 10 molar parts of

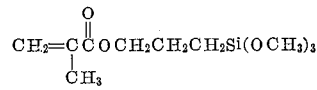

and 1 molar part of

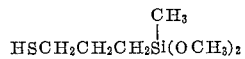

was dissolved in ethyl acetate to form a solution containing 3 percent solids. This was applied by means of an aerosol bomb to a plate of Jectron Acribase (an acrylic resin suitable for dental plates) and to a plate of Jectron Styrene (polystyrene).

After drying, a room temperature vulcanizing siloxane elastomer stock was applied to the two treated plates, which stock contained 100 parts of a dimethylpolysiloxane with OH endblocks and a viscosity of 12,500 cs., 31.5 parts of a silica filler, 9.5 parts of methyltriacetoxysilane, 0.2 part of stannous oleate, and 40 parts of a dimethylpolysiloxane plasticizer.

In both cases an excellent bond was obtained between the thermoplastic plate and the vulcanized elastomer.

EXAMPLE 14

Samples of Chemcor brand glass, sold by Corning Glass Works, were bonded to polyvinylchloride-impregnated cotton cloth of the type used in automobile convertible tops.

This was done by coating the part of the polyvinyl chloride to be bonded with the same bonding agent solution as was used in Example 13. The coating was allowed to dry, and the glass was then coated with a polysiloxane room temperature vulcanizing elastomer stock. The treated polyvinyl chloride and the glass with the elastomer coating were then brought together with firm contact until the elastomer had vulcanized.

This experiment was repeated several times with various room-temperature vulcanizing silicone elastomer stocks. The bonds between the polyvinyl chloride, elastomer, and glass were excellent in all cases.

The experiment was reported, omitting the step of coating the polyvinyl chloride with the bonding agent solution.

A poor bond was obtained between the polyvinyl chloride and the silicone elastomer.

EXAMPLE 15

When a mixed polymer consisting of 30 mol percent acrylonitrile, 30 mol percent butadiene, and 38 mol percent styrene and 2 mol percent of a partial hydrolyzate of

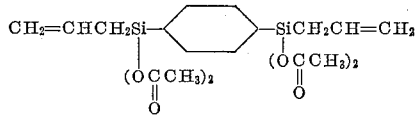

is evenly applied to the surface of a commercial acrylonitrile-butadiene-styrene terpolymer which is heated to the softening point, and an aluminum sheet is then applied to the softened terpolymer with gentle pressure, a stable bond between the aluminum and the terpolymer is obtained.

EXAMPLE 16

A copolymer of 31.8 mol percent of maleic anhydride and 68.2 mol percent of styrene, having a molecular weight of approximately 2000, was dissolved in aqueous ammonium hydroxide so as to give a one percent solids solution.

To this aqueous solution was added 0.25 weight percent based on the weight of the ammoniated copolymer, of

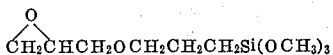

which is reactive with the carboxyl groups on the copolymer.

Glass slides were treated with this aqueous solution and dried.

Other glass slides were treated with a similar solution minus the silane.

All the slides were coated with molten polystyrene and cooled. The initial polystyrene-glass bond was in all cases excellent.

After a few minutes of immersion in lukewarm water, however, the slides which had been primed with the solution that lacked the silane lost their adhesion to the polystyrene, whereas, the bond between the polystyrene and the silane-primed slides was still good.

EXAMPLE 17

A fibrous copolymer of ethylene glycol and terephthalic acid was melted and used to bond glass slides end to end, to form composites containing two glass slides each.

The same copolymer was used to similarly bond glass slides which had been treated with an aqueous one percent emulsion copolymer consisting of 80 mol percent of ethylacrylate, 10 mol percent of vinylacetate, and 10 mol percent

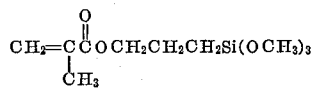

and allowed to dry.

These composites of slides were tested in the manner of Example 4.

The average time required for the unprimed composites to buckle was 30 minutes.

The average time required for the primed composites to buckle was 168 minutes.

That which is claimed is:

1. The method of bonding (1) a thermoplastic resin to (2) a material selected from the group consisting of solid siliceous materials, metals, and metal oxides comprising (a) applying to the surface of at least one of (1) and (2), (A) a copolymer which is compatible with (1), of at least one type of organic, unsaturated monomer and an organosilicon compound containing at least one silicon-bonded vinyl, allyl, or

group, where R is methyl or hydrogen and R' is lower alkylene, the remaining valence bonds of the silicon of said organosilicon compound being satisfied with oxygen, hydrolyzable groups, hydroxyl groups, hydrocarbon radicals, or halohydrocarbon radicals, each containing less than 10 carbon atoms, there being an average of at least 3 silicon-bonded hydrolyzable or hydroxyl groups per molecule of (A), and (A) having an average molecular weight of at least 2000; (b) bringing (1) and (2) in contact with each other under conditions where at least one of them is in a plastic condition, and (c) thereafter allowing the plastic material to solidify whereby an improved bond is obtained.

2. The method of claim 1 where (1) is a polyolefin.
3. The method of claim 1 where (1) is a polyacrylate.
4. The method of claim 1 where (1) is a copolymer of styrene and acrylonitrile.
5. The method of claim 1 where (1) is a polystyrene.
6. The method of claim 1 where (1) is a halogenated polyolefin.
7. The method of claim 1 where (2) is glass.
8. The method of claim 1 where (2) is an organopolysiloxane elastomer.
9. The method of claim 1 where the organic, unsaturated monomers used to make (A) are selected from the group consisting of ethylene, propylene, butadiene, styrene, acrylonitrile, methyl methacrylate, ethyl acrylate, vinyl acetate, and vinyl pyrrolidone.
10. The method of claim 1 where the organosilane used to make (A) is

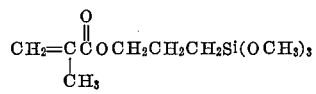

11. The method of claim 1 where (A) is prepared using a mercaptoalkyltrimethoxysilane to control the molecular weight.
12. The method of claim 1 where (A) is a polymer of

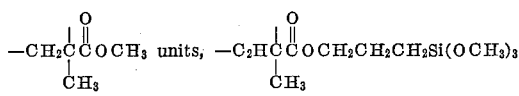

and $-SCH_2CH_2CH_2Si(OCH_3)$ units.

13. The method of claim 1 where (1) is a thermoplastic denture and (2) is a room temperature vulcanizing silicone elastomer.
14. The method of claim 1 where (1) is a thermoplastic resin-impregnated cloth and (2) is glass.
15. The method of claim 14 where (1) is a polyvinyl chloride-impregnated cloth.
16. The method of bonding (1) a thermoplastic resin to (2) a material selected from the group consisting of solid siliceous materials, metals, and metal oxides comprising (a) applying to the surface of at least one of (1) and (2), a reaction product (A), which is compatible with (1), of a polymeric, organic compound containing carbon-bonded groups selected from the group consisting of carboxyl, hydroxyl, and amino, and an organosilicon compound containing at least one silicon-bonded group of the formula

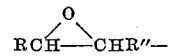

where R is methyl or hydrogen, R" is a lower alkylene radical or a lower alkylene ether radical having the free valences on carbon atoms, the remaining valence bonds of the silicon of said organosilicon compound being satisfied with oxygen, hydrolyzable groups, hydroxyl groups, hydrocarbon radicals, or halohydrocarbon radicals, each containing less than 10 carbon atoms, there being an average of at least 3 silicon-bonded hydrolyzable or hydroxyl groups per molecule of (A), and (A) having an average molecular weight of at least 2000; (b) bringing (1) and (2) in contact with each other under conditions where at least one of them is in a plastic condition, and (c) thereafter allowing the plastic material to solidify whereby an improved bond is obtained.

17. The method of claim 16 where the organosilane used to make (A) is

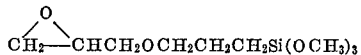

18. The method of claim 16 where (A) is the reaction product of poly(styrene-maleic acid) and

(References on following page)

References Cited by the Examiner
UNITED STATES PATENTS

| | | | |
|---|---|---|---|
| 2,557,778 | 6/1951 | Barry | 161—193 |
| 2,601,337 | 6/1952 | Smith-Johannsen | 161—193 |
| 2,768,150 | 10/1956 | Millar et al. | 260—824 |
| 2,819,245 | 1/1958 | Shorr | 260—824 |
| 2,886,890 | 5/1959 | Schnell | 264—16 X |
| 2,962,471 | 11/1960 | Lang et al. | 260—827 |
| 2,983,719 | 5/1961 | Cox et al. | 260—86.1 |
| 3,022,196 | 2/1962 | Jenkins et al. | 156—329 |
| 3,075,948 | 1/1963 | Santelli | 260—33.6 X |
| 3,088,847 | 5/1963 | Pines | 117—75 |
| 3,150,116 | 9/1964 | Masters | 260—827 X |
| 3,193,429 | 7/1965 | Yaeger | 156—329 |
| 3,211,684 | 10/1965 | Eakins | 260—824 X |
| 3,219,624 | 11/1965 | Cohen | 260—824 X |
| 3,252,825 | 5/1966 | Marzocchi et al. | 260—824 X |

EARL M. BERGERT, *Primary Examiner.*

HAROLD ANSHER, *Examiner.*

U.S. PATENT OFFICE
UNITED STATES PATENT OFFICE
CERTIFICATE OF CORRECTION

Patent No. 3,306,800                        Dated: February 28, 1971

Edwin P. Plueddemann

It is certified that errors appear in the above-identified patent and that said Letters Patent are hereby corrected as shown below:

Col. 1, line 10, the word "aplication" should read --application--.

Col. 2, line 56, the letter "S." should read --S,--.

Col. 3, line 35, the word "variabibe" should read --variable--.

Col 4, lines 5-6, the formula "resin≡C-OH + $CH_2\overset{O}{\overset{\frown}{C}}HCH_2OCH_2CH_2CH_2SiX_3$ ⟶ resin≡C-C-$CH_2\overset{OH}{C}HCH_2OCH_2CH_2CH_2SiX_3$" should read --resin≡C-OH + $CH_2\overset{O}{\overset{\frown}{C}}HCH_2OCH_2CH_2CH_2SiX_3$ ⟶ resin≡C-O-$CH_2\overset{OH}{C}HCH_2OCH_2CH_2CH_2SiX_3$"; lines 54-55, the second formul $-CH_2\overset{C}{\overset{\frown}{C}}HCH_2CH_2CH_2Si(OCH_3)_3$" should read $-CH_2\overset{O}{\overset{\frown}{C}}HCH_2CH_2CH_2Si(OCH_3)_3$--;

lines 59-61, the formula "$CH_2-\overset{O}{\overset{\|}{C}}-C-NCH_2CH_2CH_2Si(OCH_3)_3$" should read $\underset{CH_3\ CH_3}{}$ --$CH_2-\overset{O}{\overset{\|}{C}}-C-NCH_2CH_2CH_2Si(OCH_3)_3$--.
$\underset{CH_3\ CH_3}{}$ Col. 5, line 39, the word "Substrates" should read --Substrate--; line 51, the word "vulvanizing" should read --vulcanizing--.

Col. 14, lines 20-23, the formula "$-C_2H\overset{O}{\overset{\|}{C}}COCH_2CH_2CH_2Si(OCH_3)_3$" should $\underset{CH_3}{}$ read --$CH_2\overset{O}{\overset{\|}{C}}COCH_2CH_2CH_2Si(OCH_3)_3$--; after said formula insert --units-
$\underset{CH_3}{}$ Signed and sealed this 6th day of April 1971.

(SEAL)
Attest:

EDWARD M. FLETCHER, JR.                        WILLIAM E. SCHUYLER, JR.